United States Patent
Zhu et al.

(10) Patent No.: US 9,788,214 B2
(45) Date of Patent: Oct. 10, 2017

(54) METHOD FOR MEASUREMENT CONTROL AND BASE STATION USING THE SAME

(71) Applicant: Sercomm Corporation, Taipei (TW)

(72) Inventors: Ling Zhu, Jiangsu Province (CN); Bu-Qiang Sun, Jiangsu Province (CN)

(73) Assignee: SERCOMM CORPORATION, Taipei (TW)

( * ) Notice: Subject to any disclaimer, the term of this patent is extended or adjusted under 35 U.S.C. 154(b) by 0 days.

(21) Appl. No.: 15/156,609

(22) Filed: May 17, 2016

(65) Prior Publication Data

US 2017/0064563 A1 Mar. 2, 2017

(30) Foreign Application Priority Data

Aug. 24, 2015 (CN) .......................... 2015 1 0523642

(51) Int. Cl.
| | |
|---|---|
| *H04W 16/24* | (2009.01) |
| *H04W 16/20* | (2009.01) |
| *H04W 24/08* | (2009.01) |
| *H04L 12/26* | (2006.01) |
| *H04W 64/00* | (2009.01) |

(52) U.S. Cl.
CPC ......... *H04W 16/20* (2013.01); *H04L 43/0888* (2013.01); *H04L 43/16* (2013.01); *H04W 24/08* (2013.01); *H04W 64/00* (2013.01)

(58) Field of Classification Search
CPC ... H04W 4/02; H04W 36/0083; H04W 36/08; H04W 64/00; H04W 4/008; H04W 36/20; H04W 36/24
USPC ..... 455/456.1, 73, 435.1, 436; 370/338, 255
See application file for complete search history.

(56) References Cited

U.S. PATENT DOCUMENTS

| | | | |
|---|---|---|---|
| 8,700,083 | B2 | 4/2014 | Yavuz et al. |
| 8,874,101 | B2 | 10/2014 | Lau |
| 8,879,400 | B2 | 11/2014 | Koike et al. |
| 8,929,881 | B2 | 1/2015 | Sato et al. |
| 8,983,521 | B2 | 3/2015 | Zhu |
| 9,210,586 | B2 | 12/2015 | Catovic et al. |
| 9,294,925 | B2 | 3/2016 | Nakamura |

(Continued)

FOREIGN PATENT DOCUMENTS

| | | |
|---|---|---|
| CN | 102111781 A | 6/2011 |
| CN | 102422665 A | 4/2012 |

(Continued)

OTHER PUBLICATIONS

"Universal Mobile Telecommunications System (UMTS); Radio Resource Control (RRC); Protocol specification"; (3GPP TS 25.331 version 5.24.0 Release 5); ETSI TS 125 331 V5.24.0 (Jul. 2009); pp. 1-1046.

(Continued)

*Primary Examiner* — Phuoc H Doan
(74) *Attorney, Agent, or Firm* — McClure, Qualey & Rodack, LLP

(57) ABSTRACT

A method for measurement control and a base station using the same are provided. The method includes the following steps. Divide a coverage range of the base station into multiple coverage areas according to a signal coverage state. Each coverage area has at least one signal state threshold value. Receive a signal state report from a user equipment to determine a current coverage area where the user equipment is located.

16 Claims, 5 Drawing Sheets

(56) References Cited

U.S. PATENT DOCUMENTS

| | | | |
|---|---|---|---|
| 2009/0042595 A1 | 2/2009 | Yavuz et al. | |
| 2009/0042596 A1 | 2/2009 | Yavuz et al. | |
| 2009/0279519 A1 | 11/2009 | Brisebois et al. | |
| 2010/0284303 A1 | 11/2010 | Catovic et al. | |
| 2013/0023299 A1 | 1/2013 | Nakamura | |
| 2013/0273934 A1 | 10/2013 | Meredith et al. | |
| 2014/0113638 A1 | 4/2014 | Zhang et al. | |
| 2015/0031389 A1* | 1/2015 | Liu .................. | H04W 4/02 455/456.1 |
| 2015/0350923 A1 | 12/2015 | Wang et al. | |

FOREIGN PATENT DOCUMENTS

| | | | |
|---|---|---|---|
| CN | 102802185 A | 11/2012 | |
| CN | 102812741 A | 12/2012 | |
| CN | 102823304 A | 12/2012 | |
| CN | 102835168 A | 12/2012 | |
| CN | 102958150 A | 3/2013 | |
| CN | 103052081 A | 4/2013 | |
| CN | 103533554 A | 1/2014 | |
| CN | 103581995 A | 2/2014 | |
| CN | 104320817 A | 1/2015 | |
| CN | 104320817 A | 1/2015 | |

OTHER PUBLICATIONS

"LTE; Evolved Universal Terrestrial Radio Access (E-UTRA); Radio Resource Control (RRC); Protocol specification (3GPP TS 36.331 version 9.18.0 Release 9)"; (Jul. 2014); pp. 1-268.

* cited by examiner

204

| Stay time duration in the core area | Stay time duration in the edge area |
| --- | --- |
| The number of times the UE has entered the core area | The number of times the UE has entered the edge area |
| Uplink throughput in the core area | Uplink throughput in the edge area |
| Downlink throughput in the core area | Downlink throughput in the edge area |
| Stay time duration in the middle area | |
| The number of times the UE has entered the middle area | |
| Uplink throughput in the middle area | |
| Downlink throughput in the middle area | |

FIG. 7

METHOD FOR MEASUREMENT CONTROL AND BASE STATION USING THE SAME

This application claims the benefit of People's Republic of China application Serial No. 201510523642.4, filed Aug. 24, 2015, the subject matter of which is incorporated herein by reference.

BACKGROUND

Field of the Invention

The disclosure relates in general to a method for measurement control and a base station using the same, and more particularly to a method for measurement control used for multiple coverage areas in a coverage range of a base station.

Related Art

As mobile communication network becomes more and more popular, the number of mobile communication users rapidly grows, and the user demand for data service via mobile communication also increases significantly. According to the international statistics, more than 70% of the data service takes place indoors. However, indoor signals may be easily blocked or absorbed by the building, resulting in coverage problems. Taking Long Term Evolution (LTE) for example, the indoor coverage of LTE has the characteristics of small coverage range, low capacity, sparse distribution, and being vulnerable to interference. Thus it may be difficult to identify the details about user distribution and service usage, making it difficult to realize an optimized LTE indoor coverage. Therefore, it is an important subject in the industry to find out the user distribution within the coverage range.

SUMMARY

The disclosure is directed to a method for measurement control and a base station using the same, such that the user distribution within the coverage range can be found out, and the usage profile within the coverage range can be analyzed.

According to one embodiment of the invention, a method for measurement control is provided. The method includes the following steps. Divide a coverage range of the base station into multiple coverage areas according to a signal coverage state. Each coverage area has at least one signal state threshold value. Receive a signal state report from a user equipment to determine a current coverage area where the user equipment is located.

According to another embodiment of the invention, a base station is provided. The base station includes a communication unit and a processing unit. The communication unit is configured to receive a signal state report from a user equipment. The processing unit is configured to divide a coverage range of the base station into multiple coverage areas according to a signal coverage state, and determine a current coverage area where the user equipment is located. Each coverage area has at least one signal state threshold value.

The invention will become apparent from the following detailed description of the preferred but non-limiting embodiments. The following description is made with reference to the accompanying drawings.

BRIEF DESCRIPTION OF THE DRAWINGS

FIG. 7 shows a diagram illustrating contents stored in the storage unit according to on embodiment of the invention.

Figure 1A:
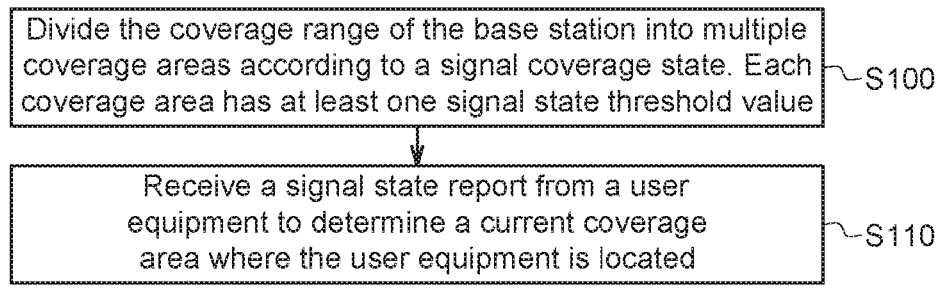
FIG. 1A shows a flowchart of the method for measurement control according to one embodiment of the invention.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

DETAILED DESCRIPTION

LTE is used in this embodiment as an example. Measurement control in LTE refers to the moving measurement control in the connection state. After an Evolved Node B (eNodeB) sends a measurement configuration to a user equipment (UE) through radio resource control (RRC) reconfiguration messages, the UE performs measurement according to the parameters defined in the measurement configuration, such as measurement object, reporting configuration, and so on. When a measurement reporting condition is satisfied, the UE submits a measurement report to the eNodeB. The measurement report is generally used for handover, redirection, or completing neighboring cell relation list. The measurement reporting condition includes event driven conditions and periodic reporting. The event driven conditions include A1-A5, B1, B2 events. The periodic reporting includes reporting the strongest cell and reporting cell global identifier (CGI). The LTE system and the base station eNodeB within the LTE system used in this embodiment are exemplary rather than limiting. The method for measurement control described below may also be applied to other mobile/wireless communication systems and the corresponding base stations/access points (AP).

FIG. 1A shows a flowchart of the method for measurement control according to one embodiment of the invention. The method for measurement control used in a base station 10 includes the following steps. Step S100: Divide the coverage range of the base station 10 into multiple coverage areas $A_i$ according to a signal coverage state. Each coverage area $A_i$ has at least one signal state threshold value $TH_i$. Step S110: Receive a signal state report from a user equipment 120 to determine a current coverage area $A_{current}$ where the user equipment 120 is located.

Figure 2:
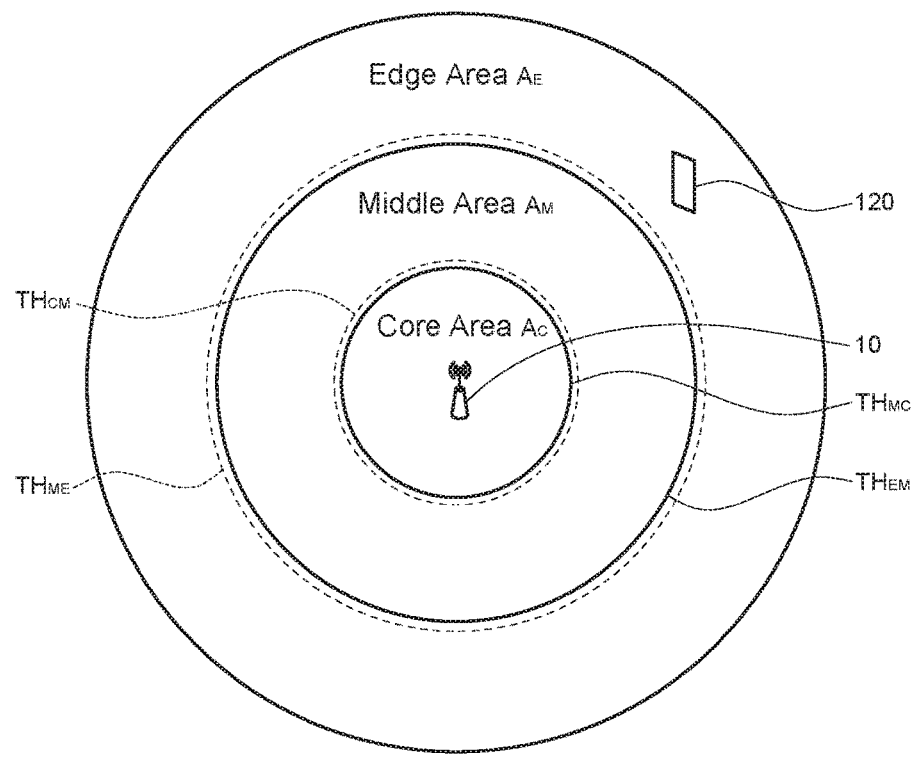
FIG. 2 shows a diagram illustrating a coverage range divided into multiple coverage areas according to one embodiment of the invention.

To clearly illustrate the method for measurement control used in the base station 10, please also refer to FIG. 2, which shows a diagram illustrating a coverage range divided into multiple coverage areas according to one embodiment of the invention. The coverage range of the base station 10 is divided into multiple coverage areas $A_i$, including a core area $A_C$, a middle area $A_M$, and an edge area $A_E$ in this example. Each coverage area $A_i$ is within the coverage range of the base station 10, and each coverage area $A_i$ is able to receive signals sent from the base station 10. The signal coverage state may be for example related to signal coverage strength or signal coverage quality. In one embodiment, the signal coverage state is related to the distance to the base station 10. The signal state becomes worse when the distance to the base station 10 becomes larger. Therefore, in this embodiment, the coverage areas form concentric circles around the base station 10. However, the shapes of the coverage areas are not limited thereto. For example, for a base station 10 located indoors, the signal coverage state may be affected by building layout and blocked by walls, and thus the shape of each coverage area may be an irregular shape that is related to the building structure.

In addition, the number of coverage areas divided is not limited to three. The minimum number may be two. When the coverage range is divided into two coverage areas, the one that is closer to the base station 10 may be defined as the core area $A_C$, and the other one that is farther away from the base station 10 may be defined as the edge area $A_E$. When the number of coverage areas divided is greater than three, the one area with the best signal coverage state may be defined as the core area $A_C$, and the one area with the worst signal coverage state may be defined as the edge area $A_E$. There may be one or more middle areas $A_M$ between the core area $A_C$ and the edge area $A_E$. Thus the coverage range of the base station 10 may be divided into the core area $A_C$, one or more middle areas $A_M$, and the edge area $A_E$, arranged in order from the center to the outer region.

Each coverage area $A_i$ has as least one signal state threshold value including for example at least one of a signal state lower bound $TH_{min}$ and a signal state upper bound $TH_{max}$. The signal state threshold value TH; acts as a signal state boundary to the neighboring coverage area $A_i$. As the example shown in FIG. 2, the core area $A_C$ has a signal state lower bound $TH_{CM}$. When the signal state reported by the UE 120 originally in the core area $A_C$ becomes less than the signal state lower bound $TH_{CM}$ (the less the signal state value reported, the worse the signal state is), it represents that the UE 120 leaves the core area $A_C$ and enters the middle area $A_M$. The middle area $A_M$ has a signal state lower bound $TH_{ME}$ and a signal state upper bound $TH_{MC}$. When the signal state reported by the UE 120 originally in the middle area $A_M$ becomes less than the signal state lower bound $TH_{ME}$, it represents that the UE 120 leaves the middle area $A_M$ and enters the edge area $A_E$. When the signal state reported by the UE 120 originally in the middle area $A_M$ becomes greater than the signal state upper bound $TH_{MC}$, it represents that the is UE 120 leaves the middle area $A_M$ and enters the core area $A_C$. The edge area $A_E$ has a signal state upper bound $TH_{EM}$. When the signal state reported by the UE 120 originally in the edge area $A_E$ becomes greater than the signal state upper bound $TH_{EM}$, it represents that the UE 120 leaves the edge area $A_E$ and enters the middle area $A_M$.

As described above, the signal state lower bound $TH_{CM}$ of the core area $A_C$ represents a threshold value for leaving the core area $A_C$ to enter the middle area $A_M$. The signal state upper bound $TH_{MC}$ of the middle area $A_M$ represents a threshold value for leaving the middle area $A_M$ to enter the core area $A_C$. Both these two threshold values represent boundaries between the core area $A_C$ and the middle area $A_M$. Therefore, the signal state lower bound $TH_{CM}$ of the core area $A_C$ may be equal to or approximate to the signal state upper bound $TH_{MC}$ of the middle area $A_M$. Similarly, the signal state lower bound $TH_{ME}$ of the middle area $A_M$ may be equal to or approximate to the signal state upper bound $TH_{EM}$ of the edge area $A_E$.

In order to prevent the UE 120 from repeatedly switching back and forth between different areas when the signal state of the UE 120 is close to the signal state lower bound $TH_{CM}$ of the core area $A_C$ and the signal state upper bound $TH_{MC}$ of the middle area $A_M$, the signal state threshold value may be appropriately set to increase buffer space. For example, the signal state lower bound $TH_{CM}$ of the core area $A_C$ may be set to be less than the signal state upper bound $TH_{MC}$ of the middle area $A_M$. The signal state lower bound $TH_{ME}$ of the middle area $A_M$ may be set to be less than the signal state upper bound $TH_{EM}$ of the edge area $A_E$.

Figure 3:
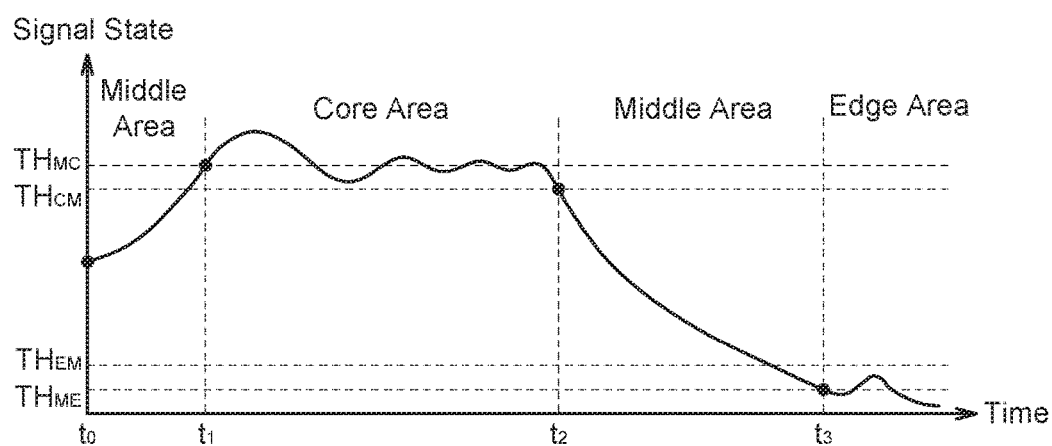
FIG. 3 shows a diagram illustrating relationship between signal state and time according to one embodiment of the invention.

By setting the threshold values as described above, FIG. 3 shows a diagram illustrating relationship between signal state and time according to one embodiment of the invention. At time $t_0$, the UE 120 is located in the middle area $A_M$. At time $t_1$, because the signal state becomes greater than the signal state upper bound $TH_{MC}$ of the middle area $A_M$, the UE 120 is determined as entering the core area $A_C$. During the period from t1 to t2, because the signal state remains greater than the signal state lower bound $TH_{CM}$ of the core area $A_C$, the UE 120 is determined as being located in the core area $A_C$. Note that during this period from $t_1$ to $t_2$, although the signal state fluctuates above and below the signal state upper bound $TH_{MC}$ of the middle area $A_M$, because the signal state lower bound $TH_{CM}$ of the core area $A_C$ is less than the signal state upper bound $TH_{MC}$ of the middle area $A_M$, the UE 120 is not determined as moving back to the middle area $A_M$ even if the signal state is less than the signal state upper bound $TH_{MC}$ of the middle area $A_M$ Such buffer space prevents the UE 120 from being determined as moving back and forth repeatedly between the core area $A_C$ and the middle area $A_M$.

At time $t_2$, because the signal state becomes less than the signal state lower bound $TH_{CM}$ of the core area $A_C$, the UE 120 is determined as entering the middle area $A_M$. At time $t_3$, because the signal state becomes less than the signal state lower bound $TH_{ME}$ of the middle area $A_M$, the UE 120 is determined as entering the edge area $A_E$. Because the signal state lower bound $TH_{ME}$ of the middle area $A_M$ is less than the signal state upper bound $TH_{EM}$ of the edge area $A_E$, even if the signal state becomes slightly greater than the signal state lower bound $TH_{ME}$ of the middle area $A_M$, the UE 120 will not be determined as moving back to the middle area $A_M$, preventing the UE 120 from being determined as moving back and forth between the middle area $A_M$ and the edge area $A_E$ too frequently.

Aforementioned description is related to the step S100 in which the coverage range is divided into multiple coverage areas $A_i$. Because the coverage range of the base station 10 is divided into multiple coverage areas $A_i$, and each coverage area $A_i$ has at least one signal threshold value $TH_i$, when receiving the signal state report from the UE 120 in the step S110, based on the received signal state report, the signal state of the UE 120 may be compared to various signal state threshold values $TH_i$ to determine the current coverage area $A_{current}$ where the UE 120 is located.

Figure 1B:
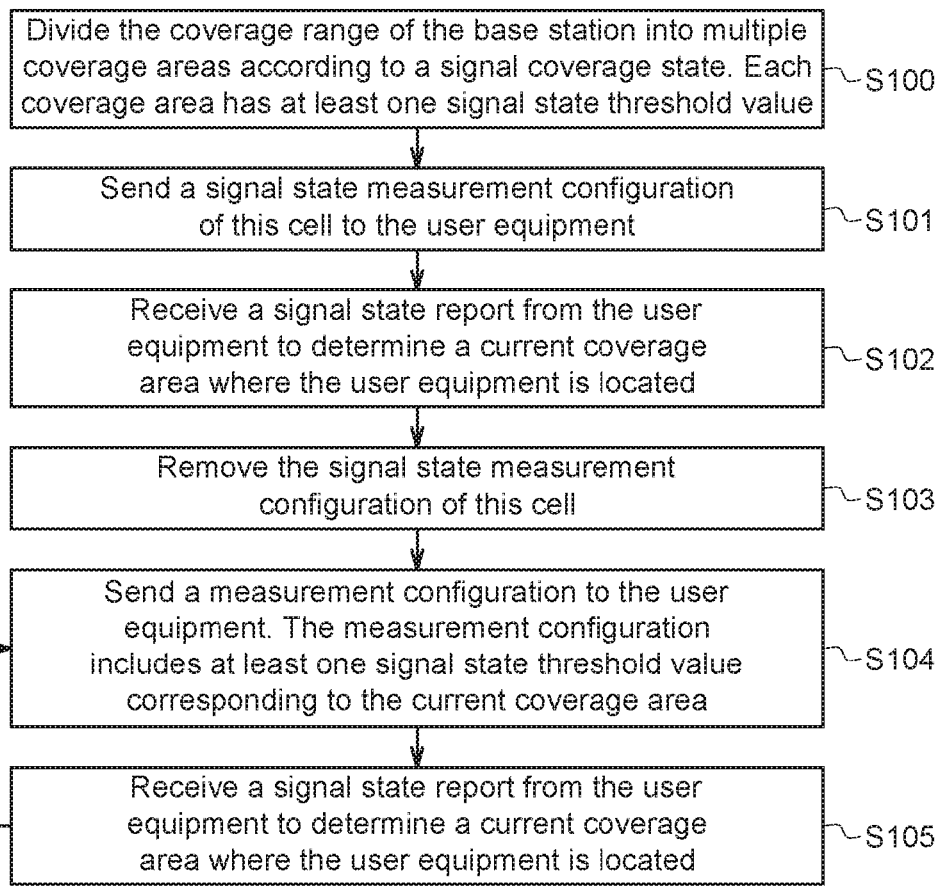
FIG. 1B shows a flowchart of the method for measurement control according to one embodiment of the invention.

FIG. 1B shows a flowchart of the method for measurement control according to one embodiment of the invention. After the step S100 in which the coverage range is divided, when the base station 10 does not know where the UE 120 is, the base station 10 first needs to know which coverage area where the UE 120 is located in the current connection state. Step S101: the base station 10 sends a signal state measurement configuration of this cell to the UE 120. Take LTE for example, after the UE 120 stays in or accesses the cell, the base station 10 sends the UE 120 periodic measurement requests, requiring the UE 120 to report the strongest cell.

Step S102: the base station receives a signal state report from the UE 120. In this embodiment, the signal state report is one of a signal strength report and a signal quality report. Take LTE for example, the signal strength report may be a report of reference signal received power (RSRP), and the signal state threshold value of each coverage area $A_i$ is the corresponding RSRP threshold value. Based on the measured RSRP in this cell reported by the UE 120 and the RSRP threshold value $TH_i$ of each coverage area $A_i$, the base station 10 determines the current coverage area $A_{current}$ where the UE 120 is located after the UE 120 accesses this cell. As another example, the signal quality report may be a report of reference signal received quality (RSRQ), and the signal state threshold value of each coverage area $A_i$ is the corresponding RSRQ threshold value. The base station 10/the UE 120 is able to determine the current coverage area $A_{current}$ where the UE 120 is located according to the signal state measured/reported by the UE 120 and the signal state threshold value of each coverage area $A_i$.

Step S103: the base station 10 removes the signal state measurement configuration of this cell sent in the step S101. In this embodiment, the step S100 refers to a process executed when the base station 10 boots up. The coverage range of the base station 10 is divided into multiple coverage areas $A_i$. The steps S101-S103 refer to a process executed right after the UE 120 accesses the cell. Based on the signal state report that is reported by the UE 120, the base station 10 is able to determine the current coverage area $A_{current}$ where the UE 120 is located. If the base station 10 already knows the coverage area where the UE 120 is located, the steps S101-S103 may be skipped.

Step S104: the base station 10 sends a measurement configuration Cfg to the UE 120. The measurement configuration Cfg includes the at least one signal state threshold value $TH_{current}$ corresponding to the current coverage area $A_{current}$. In other words, based on the current coverage area $A_i$ where the UE 120 is located, the base station 10 may send a measurement control including the signal state threshold for entering a neighboring coverage area from the current coverage area $A_{current}$ in RRC reconfiguration. Because the signal state measurement control of this cell is removed in the step S103, the UE 120 may perform measurement and report in response to only the measurement configuration Cfg sent in the step S104.

For example, when the current coverage area $A_{current}$ is the core area $A_C$, the measurement configuration Cfg includes the signal state lower bound $TH_{CM}$ of the core area $A_C$; when the current coverage area $A_{current}$ is the middle area $A_M$, the measurement configuration Cfg includes the signal state lower bound $TH_{ME}$ and the signal state upper bound $TH_{MC}$ of the middle area $A_M$; when the current coverage area $A_{current}$ is the edge area $A_E$, the measurement configuration Cfg includes the signal state upper bound $TH_{EM}$ of the edge area $A_E$. If the signal state measured by the UE 120 satisfies a signal state threshold condition for entering another coverage area $A_n$, a corresponding measurement report is submitted, and then the base station 10 is able to recognize that the UE 120 has moved from the current coverage area $A_{current}$ to another coverage area $A_n$.

When the UE 120 is located in the core area $A_C$, the measurement configuration Cfg sent from the base station 10 to the UE 120 may include only the signal state threshold value $TH_{CM}$ for entering the middle area $A_M$ from the core area $A_C$. Consequently, the UE 120 only needs to concern whether or not the measured signal state is less than the signal state threshold value $TH_{CM}$. The UE 120 does not have to submit unrelated measurement reports, making the measurement process of the UE 120 simple. In addition, because the reporting times and the reporting frequency of the UE 120 can be reduced, the power consumption of the UE 120 as well as the network resource usage can be reduced.

Step S105: the base station 10 receives a signal state report from the UE 120 to determine a current coverage area $A_{current}$ where the UE 120 is located. This step is similar to the step S102, based on the signal state report measured/submitted by the UE 120 and various signal state threshold values, the current coverage area $A_{current}$ where the UE 120 is located may be determined. In step S102, the signal state report received from the UE 120 may be a report in response to the signal state measurement configuration of this cell, whereas in step S105, the signal state report received from the UE 120 may be a report in response to the measurement configuration Cfg. The step S110 shown in FIG. 1A may be the step S102 or the step S105 shown in FIG. 2.

After the UE 120 accesses the cell, because the UE 120 may move several times within the cell, the steps S104 and S105 may be performed repeatedly. For example, after a measurement configuration Cfg_x is sent to the UE 120 in step S104, step S105 is executed to receive from the UE 120 a signal state report RP_x in response to the measurement configuration Cfg_x. The base station 10 determines the current coverage area A_y of the UE 120 according to the signal state report RP_x. Then the base station again executes step S104 to send a corresponding measurement configuration Cfg_y according to the current coverage area A_y to the UE 120. After that, when the UE 120 moves to a different coverage area, step S105 may be executed again to receive from the UE 120 a signal state report RP_y in response to the measurement configuration Cfg_y.

In one embodiment, the base station 10 may further identify a previous coverage area $A_{previous}$ where the UE 120 is located before entering the current coverage area $A_{current}$. The base station 10 may also remove from the UE 120 a previous measurement configuration Cfg' corresponding to the previous coverage are $A_{previous}$.

Based on the aforementioned example, when the UE 120 is located in the core area $A_C$, the measurement configuration Cfg_1 that the base station 10 sends the UE 120 may include only the signal state threshold value $TH_{CM}$ for entering the middle area $A_M$ from the core area $A_C$. At this time, if the signal state measured by the UE 120 is less than the signal state threshold value $TH_{CM}$, the UE 120 reports to the base station 10. Then the base station 10 is able to identify that the UE 120 enters the middle area $A_M$, and also identify that the previous coverage area $A_{previous}$ of the UE 120 is the core area $A_C$. Next, the base station 10 sends the UE 120 a new measurement configuration Cfg_2. The new measurement configuration Cfg_2 includes the signal state lower bound $TH_{ME}$ and the signal state upper bound $TH_{MC}$ of the middle area $A_M$. The new measurement configuration Cfg_2 also includes related control instructions to remove the measurement configuration Cfg_1 corresponding to the previous coverage area $A_{previous}$. As such, the UE 120 may focus on measurements related to the current coverage area $A_{current}$ according to the new measurement configuration Cfg_2, and thus the power consumption of the UE 120 and the network resource usage can be reduced effectively. The method for measurement control in this embodiment may remove the measurement configuration corresponding to the previous coverage area, and may also send the measurement configuration for entering other coverage areas according to the current coverage area, such that the base station 10 is able to know clearly how the UE 120 moves between several coverage areas.

In a general LTE system, the base station has same measurement control strategy for all the UEs accessing the cell. That is, no matter the UE is in the edge area or the core area of the cell, the measurement control sent from the base station is the same. Such method results in unnecessary measurement control, producing unnecessary cost at the UE. For example, for the UE in the core area, because the signal strength for staying in the cell is large, there is no need to send measurement controls for inter-frequency or inter radio access technology (RAT) measurements. There is even no need to send measurement control for intra-frequency handover. According to the method for measurement control in the embodiments disclosed in this invention, the base station can send appropriate measurement controls suitable for the coverage area according to various measurement control strategies and the current coverage area where the UE is located. For example, depending on the actual application scenario, the base station may send measurement controls only used for coverage issues to the UEs in the core area and the middle area, and may send measurement controls for handover and/or redirection and/or neighbor cell relation list completion to the UEs in the edge area. In another example, the base station may send measurement controls only used for coverage issues to the UE in the core area, send measurement controls for coverage and intra-frequency handover to the UE in the middle area, and send measurement controls for coverage, inter-frequency handover, redirection, and/or neighbor cell relation list completion to the UE in the edge area. According to the method in this disclosure, not only the unnecessary cost for measurement controls in the UE can be reduced, but also the base station can select the measurement control strategy with flexibility according to the application scenario. Therefore, the disclosed method reduces power consumption of the UE and also enhances UE performance and user experience.

Figure 4:
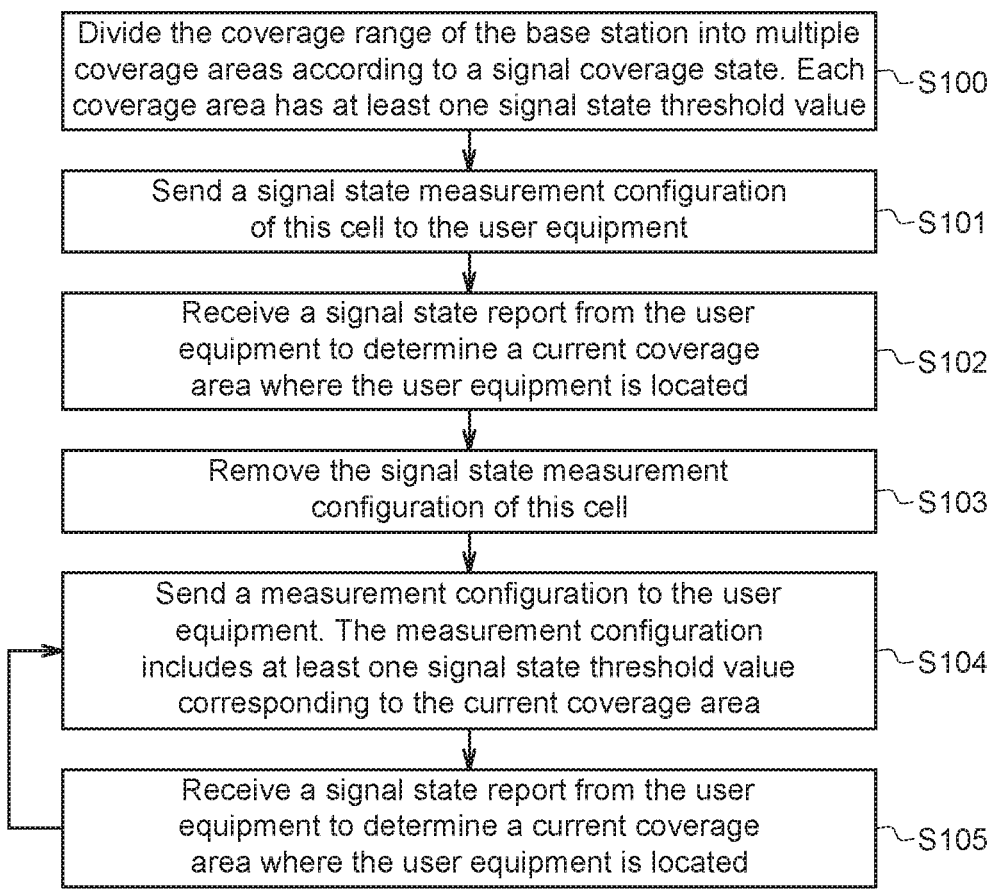
FIG. 4 shows a flowchart of the method for measurement control according to one embodiment of the invention.

Based on the method described above, the base station 10 can identify how the UE 120 moves between the coverage areas. FIG. 4 shows a flowchart of the method for measurement control according to one embodiment of the invention. The method further includes step S106 as compared to that shown in FIG. 1B. Step S106: calculate at least one of the stay time duration, the uplink throughput, the downlink throughput, and the number of times the UE has entered each coverage area.

Because the base station 10 knows which coverage area the UE is, the calculation in the step S106 may be implemented in several ways. One exemplary implementation is shown in FIG. 4. Step S106 includes step S112: Calculate at least one of the stay time duration, the uplink throughput, the downlink throughput of the UE 120 in the previous coverage area $A_{previous}$, and the number of times the UE 120 has entered the previous coverage area $A_{previous}$. Update information corresponding to the previous coverage area $A_{previous}$.

An implementation example is given below. The data structures stored in the base station 10 for storing UE information may include: Area_Type for representing the coverage area where the UE is located, Update_Time for representing the last update time, UL_throughput and DL_throughput for representing uplink and downlink throughput information of the coverage area where the UE is located at the last update. As examples, the calculation process regarding coverage may be triggered when the UE accesses the cell and the base station determines the coverage area where the UE is located, when RRC connection is released, and/or when the coverage area of the UE changes.

When the UE accesses the cell and the base station determines the coverage area where the UE is located, the coverage area where the UE is located (Area_Type) is updated, and the last update time (Update_Time) is recorded. When RRC connection is released or when the coverage area of the UE changes, the stay time duration of the UE in the previous coverage area is calculated according to the previous coverage area of the UE (Area_Type) and time difference between the current time and the last update time (Update_Time). The uplink and downlink throughput of the UE in the previous coverage area is calculated according to the current UE uplink and downlink throughput, the uplink and downlink throughput of the coverage area at the last update (UL_Throughput, DL_Throughput), and the previous coverage area of the UE (Area_Type). In other words, because the uplink and downlink throughput are recorded when the UE enters the previous coverage area $A_{previous}$ and when the UE enters the current coverage area $A_{current}$, the base station 10 may calculate the difference in-between (including time difference and throughput difference) to obtain the stay time duration, uplink throughput, and downlink throughput in the previous coverage area $A_{previous}$. In addition, the number of times the UE has entered the previous coverage area may be incremented by 1 according to the previous coverage area of the UE (Area_Type). In another embodiment, the number of times the UE has entered the current coverage area may be incremented by 1 according to the current coverage area of the UE.

The base station 10 may include a storage unit, configured to store at least one of the stay time duration, the uplink throughput, the downlink throughput, and the number of times the UE has entered each coverage area. The number of times the UE has entered each coverage area may be hereafter referred to as the entering times of each coverage area. Based on the implementation of the step S112 as described above, data stored in the storage unit may be updated at appropriate time instants to complete the statistics of each coverage area.

Based on the above calculation process, the stay time duration, the uplink throughput, the downlink throughput, and the entering times of all the UEs in each coverage area can be obtained. These statistics may be further defined as corresponding key performance index (KPI), including such as UE stay time duration KPI, UE uplink throughput KPI, UE downlink throughput KPI, and UE entering times KPI. As such, the user distribution and service usage in different coverage areas can be quantified.

Based on such KPI related to coverage areas, the user distribution and service usage in each coverage area can be obtained. Moreover, the user distribution and service usage in each coverage area may be used to adjust and optimize coverage parameters in order to enhance cell coverage. For example, if the user distribution or the user data throughput is concentrated in the edge area, the coverage range needs to be enlarged or the coverage parameters need to be adjusted to improve the data rate of users in the edge area. If the ratio of the entering times in each coverage area to the number of accessed UEs is large, it represents that the user mobility in this cell is high, the base station needs to select a power control template suitable for high user mobility to balance data rates in each coverage area, in order to improve user experience in the whole coverage range.

Figure 5:
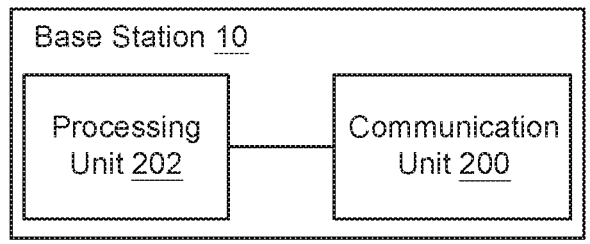
FIG. 5 shows a base station according to one embodiment of the invention.

A base station is also provided in this disclosure. FIG. 5 shows a base station according to one embodiment of the invention. In addition to some convention components not depicted in FIG. 5, the base station 10 further includes a communication unit 200 and a processing unit 202. The communication unit 200 is configured to receive a signal state report from the UE 120. The communication unit 200 may also be configured to send a measurement configuration Cfg to the UE 120. The communication unit 200 may be a wireless radio frequency circuit, configured to communicate with the UE 120 wirelessly. The processing unit 202 may be a microprocessor circuit, configured to perform arithmetic operations and make decisions.

The processing unit 202 is configured to divide the coverage range of the base station 10 into multiple coverage areas $A_i$ according to a signal coverage state. Each coverage area $A_i$ has at least or e signal state threshold value $TH_i$. The processing unit 202 determines a current coverage area $A_{current}$ where the UE 120 is located according to the signal state report. The processing unit 202 is further configured to determine a measurement configuration Cfg. The measurement configuration Cfg includes the at least one signal state threshold value $TH_{current}$ corresponding to the current coverage area $A_{current}$. The base station 10 may perform the method for measurement control as described in previous embodiments. In one embodiment, the processing unit 202 is configured to determine a previous coverage area $A_{previous}$ where the UE 120 is located before entering the current coverage area $A_{current}$. The communication unit 200 is configured to inform the UE 120 to remove a previous measurement configuration Cfg' corresponding to the previous coverage area $A_{previous}$.

Figure 6:
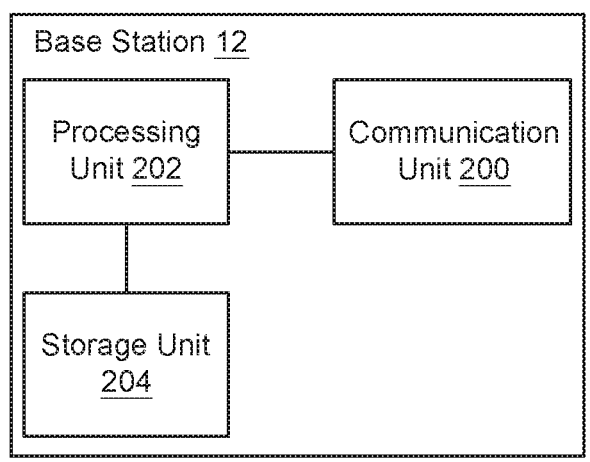
FIG. 6 shows a base station according to one embodiment of the invention.

In one embodiment, in addition to the coverage measurement flow as described above, the base station 10 may also perform coverage statistics flow. FIG. 6 shows a base station according to one embodiment of the invention. As compared to the base station 10 in FIG. 5, the base station 12 further includes a storage unit 204, configured to store at least one of the stay time duration, the uplink throughput, the downlink throughput, and the number of times the UE has entered each coverage area.

FIG. 7 shows a diagram illustrating contents stored in the storage unit according to on embodiment of the invention. In this embodiment the coverage range is divided into three coverage areas: the core area, the middle area, and the edge area. The storage unit 204 records the stay time duration, the uplink throughput, the downlink throughput, and the number of times the UE has entered these three coverage areas. In one embodiment, the processing unit 202 is configured to calculate at least one of the stay time duration, the uplink throughput, the downlink throughput of the UE 120 in the previous coverage area $A_{previous}$, and the number of times the UE 120 has entered the previous coverage area $A_{previous}$. The processing unit 202 updates information corresponding to the previous coverage area $A_{previous}$ in the storage unit 204 through difference operation and appropriate data structures. The detailed implementation has been described with reference to FIG. 4 and thus is not repeated here.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A method for measurement control, used in a base station, the method comprising:
dividing a coverage range of the base station into a plurality of coverage areas according to a signal coverage state, each of the plurality of coverage areas having at least one signal state threshold value;
receiving a signal state report from a user equipment to determine a current coverage area where the user equipment is located, wherein the current coverage area is one of the plurality of coverage areas; and
sending a measurement configuration to the user equipment according to the current coverage area;
wherein the plurality of coverage areas comprise a core area, the core area is a coverage area with the best signal state among the plurality of coverage areas.

2. The method according to claim 1, wherein the measurement configuration comprises the at least one signal state threshold value corresponding to the current coverage area.

3. The method according to claim 1, wherein the plurality of coverage areas further comprise a middle area and an edge area, the edge area is a coverage area with the worst signal state among the plurality of coverage areas.

4. The method according to claim 3, wherein the at least one signal state threshold value of each of the plurality of coverage areas comprises at least one of a signal state lower bound and a signal state upper bound, the signal state lower bound of the core area is less than the signal state upper bound of the middle area, and the signal state lower bound of the middle area is less than the signal state upper bound of the edge area.

5. The method according to claim 1, wherein the signal state report is one of a signal strength report and a signal quality report.

6. The method according to claim 1, further comprising:
determining a previous coverage area where the user equipment is located before entering the current coverage area; and
removing a previous measurement configuration in the user equipment corresponding to the previous coverage area.

7. The method according to claim 6, further comprising:
calculating at least one of a stay time duration, an uplink throughput, a downlink throughput, and a number of times the user equipment has entered each of the plurality of coverage areas.

8. The method according to claim 7, further comprising:
calculating at least one of the stay time duration, the uplink throughput, the downlink throughput of the user equipment in the previous coverage area, and the number of times the user equipment has entered the previous coverage area, and updating information corresponding to the previous coverage area.

9. A base station, comprising:
a communication unit, configured to receive a signal state report from a user equipment; and
a processing unit, configured to divide a coverage range of the base station into a plurality of coverage areas according to a signal coverage state, and determine a current coverage area where the user equipment is located, wherein each of the plurality of coverage areas has at least one signal state threshold value, and the current coverage area is one of the plurality of coverage areas;
wherein the processing unit is configured to determine a measurement configuration according to the current coverage area, and the communication unit is configured to send the measurement configuration to the user equipment;

wherein the plurality of coverage areas comprise a core area, the core area is a coverage area with the best signal state among the plurality of coverage areas.

10. The base station according to claim 9, wherein the measurement configuration comprises the at least one signal state threshold value corresponding to the current coverage area.

11. The base station according to claim 9, wherein the plurality of coverage areas further comprise a middle area and an edge area, the edge area is a coverage area with the worst signal state among the plurality of coverage areas.

12. The base station according to claim 11, wherein the at least one signal state threshold value of each of the plurality of coverage areas comprises at least one of a signal state lower bound and a signal state upper bound, the signal state lower bound of the core area is less than the signal state upper bound of the middle area, and the signal state lower bound of the middle area is less than the signal state upper bound of the edge area.

13. The base station according to claim 9, wherein the signal state report is one of a signal strength report and a signal quality report.

14. The base station according to claim 9, wherein the processing unit is configured to determine a previous coverage area where the user equipment is located before entering the current coverage area, and the communication unit is configured to inform the user equipment to remove a previous measurement configuration corresponding to the previous coverage area.

15. The base station according to claim 14, further comprising:
 a storage unit, configured to record at least one of a stay time duration, an uplink throughput, a downlink throughput, and a number of times the user equipment has entered each of the plurality of coverage areas.

16. The base station according to claim 15, wherein the processing unit is configured to calculate at least one of the stay time duration, the uplink throughput, the downlink throughput of the user equipment in the previous coverage area, and the number of times the user equipment has entered the previous coverage area, and update information corresponding to the previous coverage area in the storage unit.

\* \* \* \* \*